United States Patent
Ross et al.

[11] 3,979,749
[45] Sept. 7, 1976

[54] RANGE READOUT APPARATUS

[75] Inventors: Gerald F. Ross, Lexington; Kenneth W. Robbins, Wilmington, both of Mass.

[73] Assignee: Sperry Rand Corporation, New York, N.Y.

[22] Filed: Dec. 23, 1974

[21] Appl. No.: 535,317

[52] U.S. Cl. .............................................. 343/13 R
[51] Int. Cl.² .......................................... G01S 9/06
[58] Field of Search ...................... 343/12 R, 13 R

[56] References Cited
UNITED STATES PATENTS

| | | | |
|---|---|---|---|
| 2,534,862 | 12/1950 | Fox | 343/13 R |
| 2,626,313 | 1/1953 | Napolin | 343/13 R X |
| 2,977,587 | 3/1961 | Herbst | 343/12 R |

*Primary Examiner*—Malcolm F. Hubler
*Attorney, Agent, or Firm*—Howard P. Terry; Seymour Levine

[57] ABSTRACT

A range measurement system wherein range accuracies of fractions of a meter may be obtained. Nanosecond pulses, one triggered by the transmitter trigger with an appropriate delay and the other triggered by a received echo pulse, are launched from opposite ends of a transmission line. The location on the transmission line at which the two short pulses coalesce and the delay time of the transmitter triggered short pulse establish the range to the echoing object to an accuracy determined by the short pulse, pulse width.

13 Claims, 6 Drawing Figures

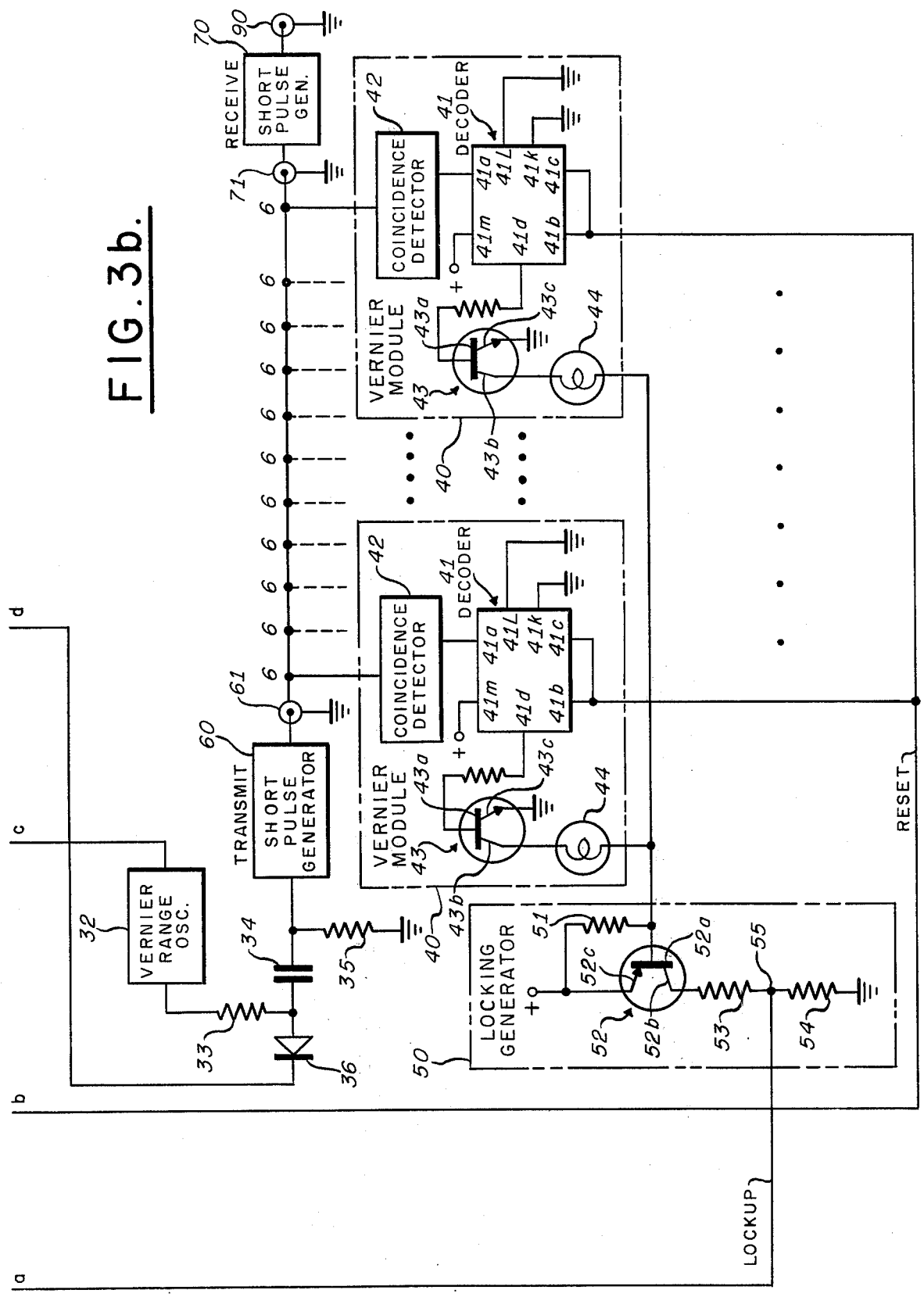

RANGE READOUT APPARATUS

BACKGROUND OF THE INVENTION

1. Field of the Invention

This invention pertains to means for determining range to an object and more particularly relates to the determination of range to an accuracy of less than two feet (60.96 cm).

2. Description of the Prior Art

Measurement of range electronically involves the determination of the time difference of arrival between an echo signal and a suitable reference. Usually the reference is a transmitted signal which must be marked in some distinguishing manner to establish an initial time at the receiver from which the time of the return of the echo may be determined. This timing mark may be referenced to a transmitted pulse, as in a pulse radar, and the range determined from time of return of the echo pulse. An analog approach to the problem involves starting a ramp at the instant of transmission which establishes $t = 0$ and terminating the ramp at $t = \tau$, the time at which the echo is received. The d.c. voltage at the termination of the ramp is held by operational amplifiers and other d.c. stabilizing networks until the beginning of a new period, at which time the ramp is reset. D.C. average voltage over a number of transmission periods, which varies as a function of range, is measured by a d.c. meter. The degree to which the ramp voltage at $t = \tau$ is maintained by the stabilizing circuits determines the accuracy of the measurement. Another analog technique employs a course range delay generator, such as a multivibrator, and a fine range generator, consisting of one or more precision phase shifters which provide the ultimate time reference in terms of fractions of a cycle of a basic ranging oscillator, to determine the time between the transmitted pulse and reception of its echo. These systems exhibit systematic errors of several yards (meters) even with linearities of one-tenth of one percent.

A digital approach to this problem, capable of achieving range accuracies in the order of one foot (30.48 cm), involves the gating of a 1 GHz oscillator and counting cycles. To count at a 1 GHz rate requires expensive and elaborate circuitry and consequently is not an attractive solution to the problem. The subject invention discloses a coarse range-fine range system with which the accuracy obtainable by digital techniques may be inexpensively achieved. This is accomplished by combining conventional digital techniques with a distributed network approach to provide digital processing accuracy at a saving of an order of magnitude or more in the cost of components.

SUMMARY OF THE INVENTION

The invention pertains to range measurement systems in which the measurement is to be performed to an accuracy of one or two feet (30.48 or 60.96 cm). This is accomplished by determining the position along a transmission line at which two short pulses, launched from opposite ends of the line, coalesce. These pulses are produced by short pulse generators at each end of the line which are triggered by the transmitter trigger at one end and by the received echo pulse at the other. Triggering of the short pulse generator at the transmitter end is delayed to insure that the short pulse appears on the transmission line simultaneously with the short pulse triggered by the reception of the echo pulse. The delay time and line length are functions of the maximum and minimum range for which measurements are desired. Short pulse coincidence location on the transmission line is determined by uniformly placing coincidence detectors along the transmission line with a spacing equal to the accuracy to which the range measurement is desired. The pulse width of at least one of the short pulses, when multiplied by the velocity of an electromagnet wave along the transmission line, is somewhat greater than the tap spacing. Systems of this type in which large measurement increments are desired, require relatively long transmission lines and concomitantly, an excessive number of coincidence detectors if only a single delay is utilized. To reduce the number of detectors along the transmission line a coarse range-fine range system is disclosed that employs a fixed length of line, with a reasonable number of detectors, which determines the fine range increment, in conjunction with a variable delay which determines the coarse range increment.

To insure that a measure is not reported due to a noise spike in the system, circuitry is provided that requires four successive echo pulse receptions before a measurement is reported. If this does not occur, the system is reset and the process is repeated at another coarse range increment.

BRIEF DESCRIPTION OF THE DRAWINGS

FIGS. 3a and 3b together comprise a schematic representation of a preferred embodiment of the invention;

DESCRIPTION OF THE PREFERRED EMBODIMENTS

Figure 1:
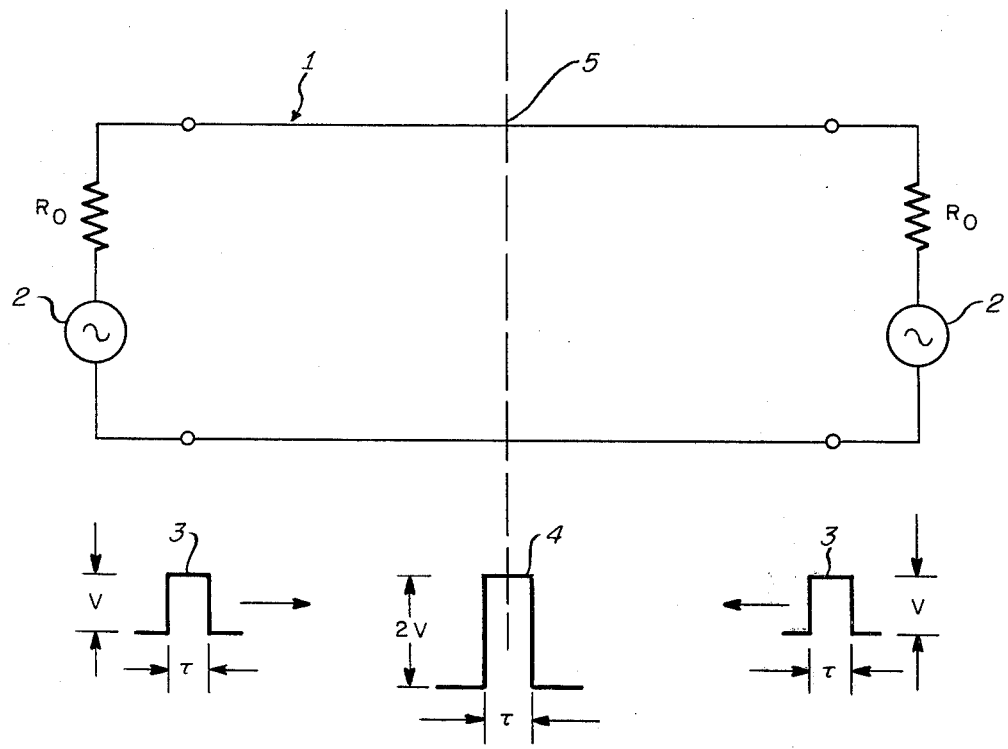
FIG. 1 is a schematic representation of a transmission line terminated at both ends with its characteristic impedance and pulse generators.
Figure 2:
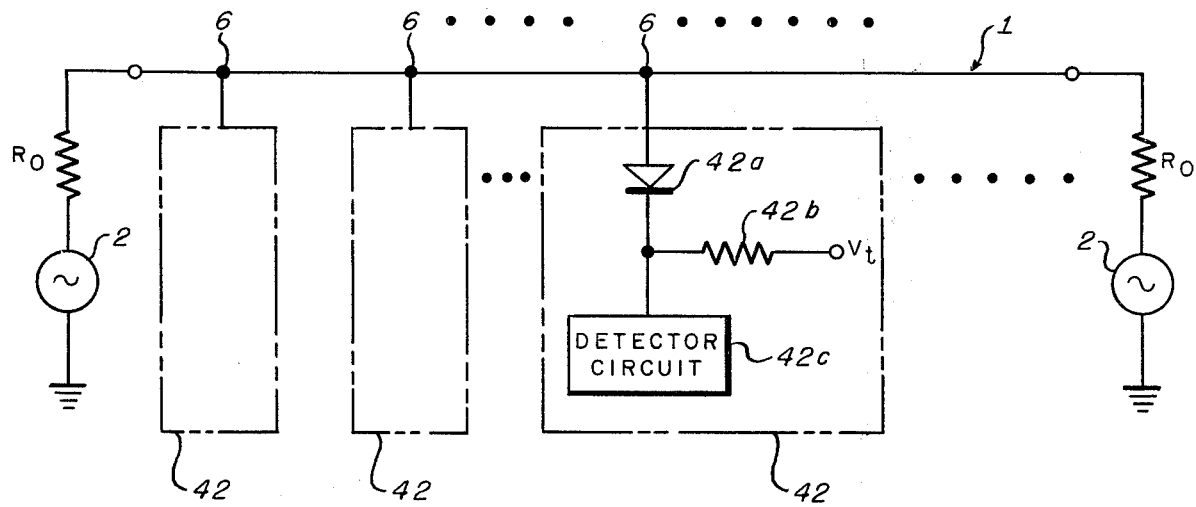
FIG. 2 is a schematic representation of a transmission line, terminated at both ends with its characteristic impedance and pulse generators, with taps along the line to which coincidence detectors are coupled.

FIG. 1 is a schematic of a transmission line 1 terminated at both ends with generators 2 which produce identical pulse waveforms 3 of amplitude V and pulse width, $\tau$, each generator possessing internal impedance, $R_o$, equal to the characteristic impedance of the transmission line. If $\tau$ is very much less than the transmit time across the transmission line, the two pulses will meet only in the vicinity of the point 5 midway between the two generators and an observer positioned at this point would observe a wavefront 4 with a voltage 2V, equal in amplitude to twice the voltage of each pulse, which commences at the time the two pulses arrive at his location and terminates when each pulse has completely passed by, the observation interval being equal to a pulse width $\tau$. Since the pulses 3 only coalesce at the midpoint 5, observers positioned at any other location along the line will only observe a pulse with amplitude V as each of the pulses 3 traverse the other locations. In this manner a length of transmission line provides a very efficient summing network. If one of the pulses 3 were to experience a delay prior to entering the transmission line 1, the two pulses 3 would coalesce at a location on the line other than the midpoint 5. The location at which the two pulses coalesce may be determined by placing taps, to which coincidence detectors are coupled, uniformly along the transmission line. Refer to FIG. 2 in which a number of taps 6 equally spaced along the transmission line are shown. Connected at each tap 6, is a coincidence detector 42, which may include a diode 42a biased to a threshold voltage $V_t$ via resistor 42b and a detector circuit 42c. Each threshold voltage back biases the diode 42b at a voltage between V and 2V to prevent conduction unless two pulses coalesce at the tap location. Since both ends of the transmission line 1 are terminated in the characteristic impedance $R_o$ of the transmission line 1, reflections that may cause multiple range indications, do not exist. However, variations from perfect matches may exist without causing spurious range responses when the diodes 42a at the taps 6 are properly biased.

Assume that the two pulses, travelling on the transmission line, are to coalesce at one end of the line for the maximum range to be measured, $R_{max}$, and at the other end of the line for the minimum range to be measured, $R_{min}$. For this situation, the line length L, and range delay D are related by:

$$D + L = 2 R_{max}$$

$$D - L = 2 R_{min}$$

and $$L = R_{max} - R_{min}$$

$$D = R_{max} + R_{min}$$

If one fixed range delay is utilized, with the concomitant length of line, for a given $R_{max}$ and $R_{min}$, an undesirable multiplicity of taps may be required to provide the range accuracy desired. To reduce this multiplicity a line length, $L_o$, may be chosen, which will require only a reasonable number of taps to achieve the desired accuracy and the delay varied to step the range interval, determined by the fixed line, over the entire distance for which measurements are desired. This is accomplished if D is varied in accordance with:

$$D = 2R_o + (2n-1)L_o$$

where $n$ is an integer, 1, 2 . . . . N, corresponding to the first, second, etc. delay step or coarse range setting and $R_o$ is the minimum range to be measured. In this manner each delay provides range measurements in the interval defined by:

$$R_{min} = R_o + (n-1)L_o$$

$$R_{max} = R_o + nL_o$$

Figure 3A:
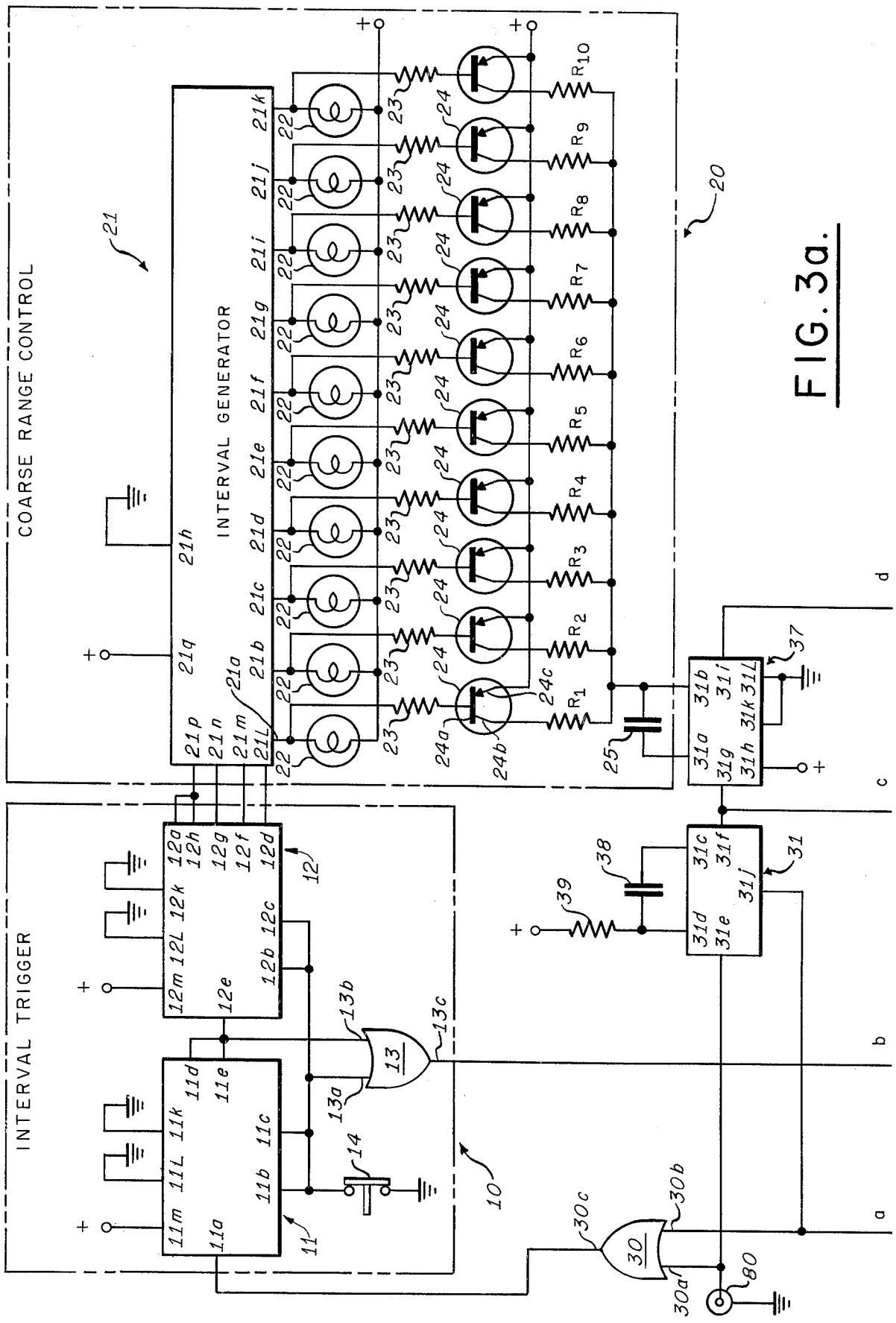

Referring now to FIG. 3, a 10 KHz square wave signal from a master oscillator (not shown) is coupled to an OR gate 30 at terminal 30a and to the burst control generator 31 at terminal 31e via terminal 80. The burst control generator comprising terminals 31c, d, e, f, j may be part of a SN 74123 logic chip with terminal 31c, d, e, f, j corresponding to pins 6, 7, 10, 5, and 9, respectively. Terminal 31j is coupled to locking generator 50 while 31d is coupled to 31c via capacitor 38 and to a positive d.c. source (not shown) via resistor 39. A second input is supplied to OR gate 30, at terminal 30b, from the output of locking generator 50. OR gate 30 and locking generator 50 comprise the means for system lock-up. The output of OR gate 30, which in the absence of a lock-up signal from locking generator 50 is the 10 KHz input signal at terminal 80, appears at terminal 30c and is coupled to interval trigger 10 at terminal 11a.

Interval trigger 10 may consist of two SN 7490 logic chips 11 and 12. Terminal 11a, of logic chip 11, corresponds to pin 1 of the 7490 while terminals 11b of logic chip 11 and 12b of logic chip 12 correspond to pin 2 and terminals 11c of logic chip 11 and 12c of logic chip 12 correspond to pin 3. Terminals 11b, 11c, 12b and 12c are interconnected with terminal 13a of OR gate 13 and are coupled to the reset mechanism 14, which when engaged grounds these terminals. Reset mechanism 14 and OR gate 13 comprise the means for system reset. Terminal 11d of logic chip 11 (pin 11 of the 7490) and terminal 11e (pin 14) are interconnected and coupled to terminal 12e of logic chip 12 (pin 14 of the 7490) and to terminal 13b of OR gate 13. In the absence of a lock-up signal from locking generator 50 the output of the interconnected terminals 11d and 11e is one positive pulse after every fourth pulse of the 10 KHz master oscillator. Terminal 13c of OR gate 13 is coupled to the vernier modules 40 and provides a reset pulse to these modules, in the absence of a lock-up signal, control 20. a positive pulse appears at either terminal 13a or 13b. Terminal 11n and 12n of logic chips 11 and 12 (pin 5 of the 7490) are coupled to a positive d.c. source (not shown) while 11L, 12L and 11k, (pins 10 and 7, respectively of the 7490) all are grounded. Terminals 12a and 12h (pins 1 and 12 respectively) are interconnected and with terminals 12g, 12f and 12d (pins 9, 8 and 11, respectively) provide a digital code to coarse range control 20.

Coarse range control 20 may consist of an interval generator 21, which may be a SN 7445 one out of ten decoder, a coarse range indicator, which may be ten lamps 22 each of which may be a 2182 rated at 14 volts and 80 milliamps, and a coarse range control timer which may include the combination of ten transistors 24 each of which may be a MPS 404, ten resistors $R_1$ through $R_{10}$ and a capacitor 25. Transistors 24 provide gates through which one of the resistors $R_1$ through $R_{10}$ is selected. The combination of the selected resistor with capacitor 25 establishes a timing means for delay generator 37. Terminals 21L, m, n, p and 21q (coupled to a positive d.c. source not shown) of decoder 21 correspond to pins 12 through 16, respectively of the 7445 while terminals 21a through k correspond to pins 1 through 11. The terminals 21L, 21m, and 21n are respectively coupled to terminals 12d, 12f, and 12g of logic chip 12 and terminal 21p is coupled to terminals 12a and 12h. Each of terminals 21a through k, with the exception of 21h which is grounded, is coupled to a positive d.c. source (not shown) via lamps 22 and to the base 24a of one of the transistors 24 through a resistor 23. The emitters 24c of each of the transistors 24 are coupled to a positive d.c. source (not shown) while each of the collectors is coupled to the delay generator 37 at terminal 31b via one of the resistors $R_1$ through $R_{10}$ and at terminal 31a via one of these resistors and capacitor 25. Delay generator 37 may be part of a SN 742123 logic chip comprising terminals 31a, b, g, h, i, k and L which correspond to pins 14, 15, 2, 16, 1 and 8, respectively, wherein terminals 31k and L are grounded, terminal 31g coupled to terminal 31f of burst control generator 31 and to vernier range oscillator 32, terminal 31h couples to a positive d.c. source (not shown) and terminal 31i couples to the cathode of diode 36, the anode of which couples to vernier range oscillator 32 via resistors 33, to transmit short pulse generator 60 via capacitor 34 and to ground via capacitor 34 and resistor 35. The combination of diode 36, capacitor 34, resistors 33 and 35 and vernier range oscillator 32 form a trigger which in combination with delay generator 37 constitutes the transmit short pulse trigger.

Transmission line 1 which is divided into ten equal segments by eleven taps 6 and is twenty electrical feet long (6.096 meters) couples to transmit short pulse generator 60 at terminal 61 and to receive short pulse generator 70 at terminal 71. Receive short pulse generator 70 in turn coupled to a receiver (not shown) at terminal 90. Coupled to each tap 6 is vernier module 40 which may consist of: coincidence detector 42; decoder 41, which may be a SN 7490; transistor 43, which may be a 2N4124; and vernier range indicator 44, which may be a 2182 lamp. Transmission line 1, taps 6 and vernier modules 40 comprise a vernier range indicator. In the following description the letter terminals of decoder 41 bear the same correspondence to the pins of logic chip SN 7490 as previously specified with respect to logic chips 11 and 12. The output of coincidence detector 42 is coupled to terminal 41a of decoder 41. Terminals 41L and k of decoder 41 are grounded while 41b and 41c are coupled to terminal 13c of OR gate 13, which supplies reset pulses. Decoder 41 output appears at terminal 41d which is coupled through resistor 45 to the base 43a of transistor 43, while the collector 43b is coupled to locking generator 50. Locking generator 50 may consist of resistor 51, transistor 52, which may be a 2N4126, resistor 53 and resistor 54. The base 52a of transistor 52, is coupled to the emitter 52c and a positive d.c. source (not shown) via resistor 51 and to the collector 43b of transistor 43 via lamp 44, while collector 52b is coupled to ground via resistors 53 and 54. The junction 55 of resistors 53 and 54, at which the lock-up signal appears, is coupled to OR gate 30 at terminal 30b.

Figure 4:
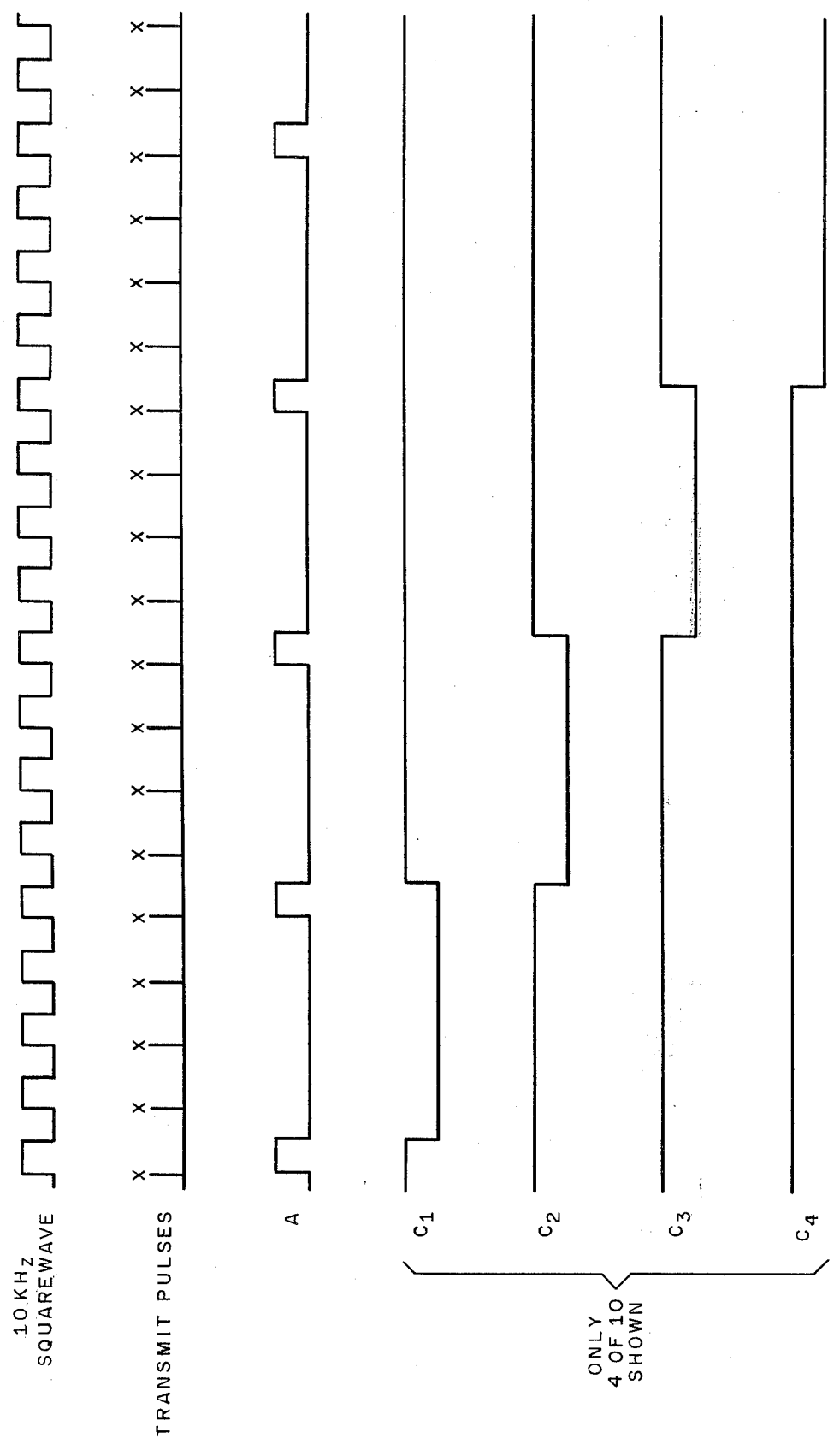
FIG. 4 is a representation of the waves utilized to provide the coarse range timing.
Figure 5:
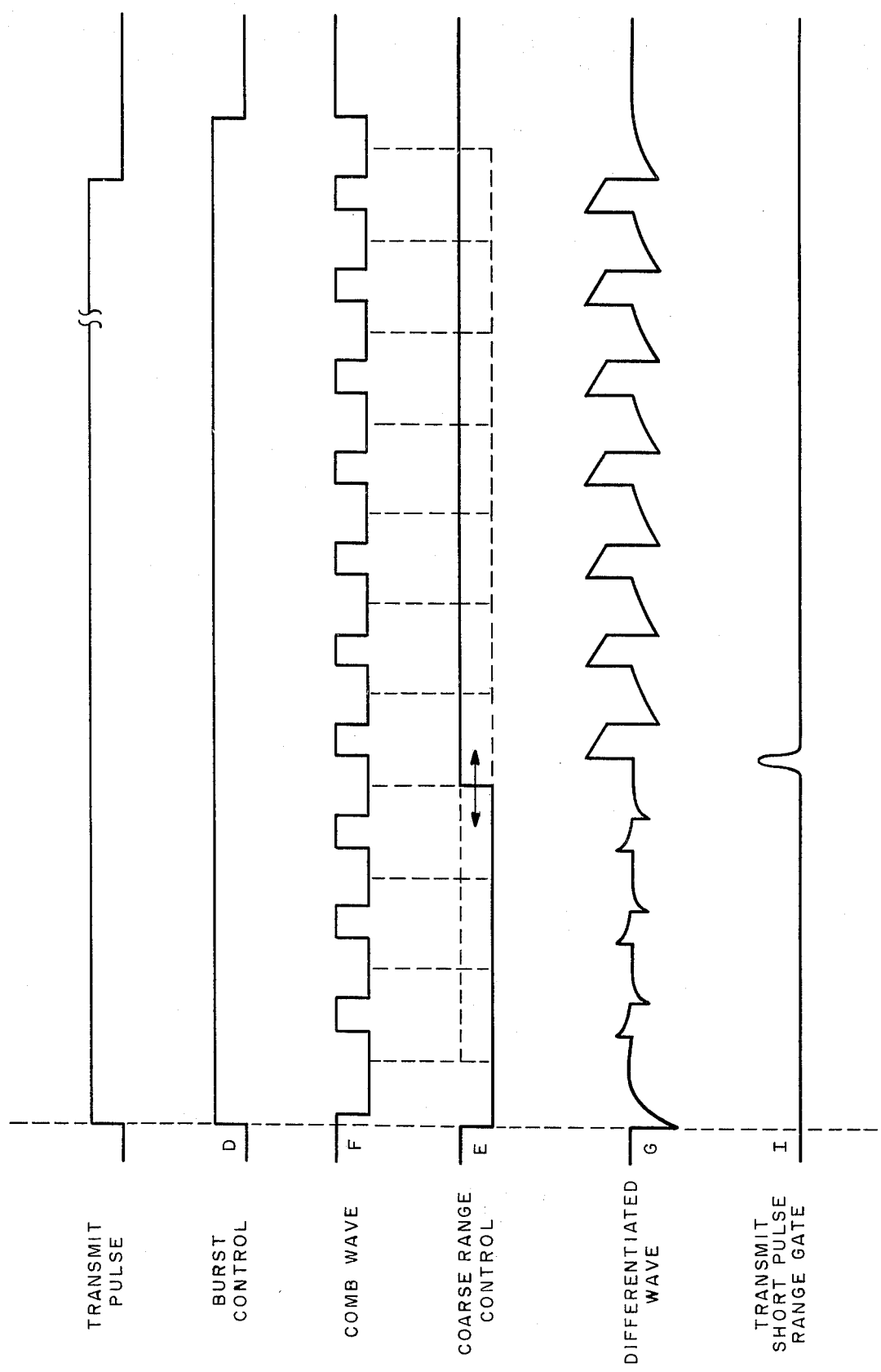
FIG. 5 is a representation of the waves utilized to provide vernier range timing.

The various waves utilized in the system and their timing relationships are shown in FIGS. 4 and 5. A 10 KHz square wave shown in FIG. 4 triggers a transmitter (not shown) on each leading edge of a positive pulse as indicated by the wave labeled "transmit pulses". This 10 KHz square wave is also applied to terminal 80 and coupled to terminal 11a of interval trigger 10, FIG. 3, in the absence of a lock-up signal at terminal 30b of OR gate 30. Logic chip 11 decodes this signal and provides one pulse at terminal 11d for every four pulses of the 10 KHz square wave producing wave A of FIG. 4 which is coupled to logic chip 12 at 12e. The trailing edge of each pulse of wave A triggers a code at terminals 12d, f, g and h of logic chip 12 which is coupled to logic chip 21 of coarse range control 20. This code sets one of the terminals 21a through 21g and 21i through 21k or decoder 21 to low where it remains until the next trailing edge which generates a code that resets the voltage at the terminal to high and sets the voltage at the next terminal to low. The second terminal remains in the low state for one interpulse period of wave A, after which the trailing edge of the pulse of wave A resets it to a high and sets the next terminal to low. This process is cyclic and continues until a lock-up signal is generated. Four of the ten waves so generated, $C_1$ through $C_4$, which appear at terminals 21a through 21d of decoder 21, are shown in FIG. 4. The low at each terminal commences midway between the transmission of two transmitter pulses and is of sufficient duration to allow for the transmission of four transmitter pulses before termination, which is also midway between the transmission of two transmitter pulses. Wave A is also coupled to terminal 13b of OR gate 13 in FIG. 3 and triggers reset pulses from terminal 13c to vernier modules 40 whenever four consecutive hits are not recorded by these modules.

The 10 KHz square wave of FIG. 4 is also coupled to terminal 31e of the burst control generator 31. The leading edge of each pulse of the square wave triggers a one shot burst control wave D of FIG. 5, the width of which is controlled by the time constant of resistor 39 and capacitor 38. This burst control wave D, which appears at terminal 31f, is coupled to vernier range oscillator 32 of FIG. 3, which generates the comb wave F of FIG. 5, for the duration of the burst. The period of comb wave F corresponds to the length of a coarse range interval, each period representing a given coarse range, and the total number of periods, within the duration of the burst control wave D, is equal to the total number of coarse ranges plus the number of periods required to establish the delay for the initial coarse range increment. The burst control high which is coupled to terminal 31g, of delay generator 37, causes the output at 31i to go low where it remains until it is timed out and reset to high as discussed below, forming wave E. While the output of terminal 31i is low, diode 36 conducts clamping the output of vernier range oscillator 32 to a low level. When the output of one of the terminals 21a through g and 21i through k is low the lamp connected to that terminal lights, indicating the coarse range setting. Also the transistor coupled to that terminal conducts, selecting the resistor coupled to the collector, which in combination with capacitor 25 establishes a time constant which determines the termination of the low of wave E, that is, the time constant establishes the time at which the output at 31i is reset to a high after it has been set to a low at the commencement of wave D. The duration of the low of waveform E determines the number of pulses of the comb wave which are clamped to a low level. This number establishes the coarse range setting. Each time constant is set to terminate the low of coarse range control E approximately midway between two pulses of comb wave F. The resulting comb wave is then differentiated to produce differentiated wave G. The first high pulse of wave G triggers the transmit short pulse generator which produces one 2 nanosecond range gate, I in FIG. 5, for the remaining duration of the burst.

Short pulse I is launched on transmission line 1 from terminal 61, FIG. 3. The processed echo pulse from the receiver (not shown) appears at terminal 90 and is coupled to receive short pulse generator 70. The leading edge of this pulse triggers the generator 70 which produces a 1 nanosecond pulse that is coupled to transmission line 1 at terminal 71. The 2 nanosecond pulse and the 1 nanosecond pulse travel along the transmission line in opposite directions. When the two pulses coalesce at one of the taps 6, the coincidence detector 42 at that tap reports a hit to decoder 41. When four successive hits are reported to decoder 41, a positive output is produced at terminal 41d causing transistor 43 to conduct, lighting the vernier lamp 44 and producing a low at the base 52a of transistor 52, causing the transistor to conduct creating a high at junction 55. This high is coupled to terminal 30b of OR gate 30 and terminal 31j of burst control generator 31 disabling the coarse range indicator trigger 10 and burst control generator 31 thus locking up the system. After lock-up has occurred, the system can be reset by removing terminals 11b and 11c of logic chip 11 and 12b and 12c of logic chip 12 from ground by operating the reset mechanism, thus producing a high at terminal 13a of OR gate 13. This produces a high at terminal 13c which resets all vernier modules. Though FIG. 3 shows reset mechanism 14 as a mechanical push button, an automatic reset mechanism may be incorporated which may reset the system at any desired rate. If four consecutive hits are not recorded, the next pulse of wave A resets decoder 41 and the process continues for the next coarse range.

As discussed herein, comb wave F was assumed to have started simultaneously with the occurrence of burst control D. However, waveform F may have an inherent starting delay which will affect the accuracy of the measurement. Compensation for this delay may be accomplished by delaying the transmitted pulse or by incorporating a length of transmission line prior to the first tap 6 at the receive short pulse generator 70 end of transmission line 1.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. A range measurement apparatus, including a transmitter and a receiver, with which a range measurement is accomplished by selecting one of a multiplicity of coarse range increments each of which is continuously followed by a coarse range interval wherein a fine range increment is determined comprising:

first input means for receiving pulses from said transmitter;

interval trigger means coupled to said first input means for producing coarse range interval codes in response to said transmitter pulses;

coarse range control means coupled to said interval trigger means for selecting coarse range increments in response to said coarse range interval codes;

burst control generator means coupled to said first input means for producing a burst control gate in response to said transmitter pulses said burst control gate having a duration corresponding to a multiplicity of said coarse range intervals, a successive number of which, commencing with the first its representative of said selected coarse range increment;

transmit short pulse trigger means coupled to said burst control generator means and said coarse range control means for providing a trigger pulse at the commencement of the coarse range interval corresponding to said selected coarse range increment;

transmit short pulse generator means coupled to said transmit short pulse trigger means for producing a short pulse in response to said trigger pulse;

second input means for receiving pulses from said receiver;

receive short pulse generator means coupled to said second input means for producing a short pulse in response to a pulse at said second input means; and fine range measurement means, for determining said fine range increment, coupled to receive short pulses from said transmit and said receive short pulse generators, wherein a multiplicity of fine range increments are established, the total of which is representative of a coarse range interval, and wherein said short range increment is determined by the coincidence of said short pulses from said transmit and said receive short pulse generators within one of said fine range increments.

2. A range measurement apparatus in accordance with claim 1 further including a system lock-up means comprising:

locking generator means having an input terminal coupled to said fine range measurement means and an output terminal coupled to said burst control generator means for providing a signal in response to a signal from said fine range measurement means indicating the completion of a range measurement and disabling said burst control generator means; and OR gate means having a first input terminal coupled to said first input means, a second input terminal coupled to said output terminal of said locking generator means and an output terminal coupled to said interval trigger means, whereby in the absence of a signal from said locking generator means at said second input terminal, a pulse at said first input terminal coupled from said first input means causes said OR gate to generate a pulse which causes said interval trigger means to respond, but in the presence of a signal from said locking generator a continuous signal is coupled to said interval trigger means, thus preventing a response from said interval trigger means to a pulse at said first input means.

3. A range measurement apparatus in accordance with claim 1 wherein said coarse range control means comprises:

interval generator means, coupled to said interval trigger means and responsive to said interval codes, having a multiplicity of output terminals said output terminals sequentially pulsed with pulses of equal length in accordance with said interval codes, said length of said pulse determining the system observation time and each pulsed output terminal corresponding to one of a multiplicity of sequential coarse range increments, each of which have contiguous coarse range intervals associated therewith; and coarse range control timer means having a plurality of input terminals, each input terminal corresponding to one of said output terminals of said interval generator for providing an output signal responsive to said pulse at said output terminals of said interval generator, said output signal coupled to said transmit short pulse trigger means, whereby a delay between the start of said burst control gate and the generation of said transmit short pulse is established.

4. A range measurement apparatus in accordance with claim 3 further including coarse range indicator means coupled to each of said output terminals of said interval generator means, each of said indicator means for indicating said coarse range increment.

5. A range measurement apparatus in accordance with claim 3 wherein said coarse range control timer means comprises:

a plurality of gating means each coupled to one of said output terminals of said interval generator means; and a plurality of timing means, each having an input terminal coupled to one of said gating means and an output terminal coupled to said transmit short pulse trigger means each of said plurality of timing means for determining the duration of said delay for each of said coarse range intervals corresponding to said pulses at said output terminals of said interval generator means.

6. A range measurement apparatus in accordance with claim 3 further including a reset means and wherein said fine range measurement means further contains a lock-up terminal coupled to said interval trigger means, and a reset terminal, said reset means coupled to said reset terminal and to said interval trigger means, said reset means for resetting said fine range indicator at the commencement of said observation time for each of said coarse range increments in the absence of a signal, coupled from said lock-up terminal to said interval trigger means, indicating the completion of a range measurement for the previous coarse range increment.

7. A range measurement apparatus in accordance with claim 6 wherein said reset means further includes means for resetting said fine range indicator after said system lock-up has occurred.

8. A range measurement apparatus in accordance with claim 1 wherein said fine range measurement means comprises:
  a transmission line coupled at one end to said transmit short pulse generator and at the other to said receive short pulse generator;
  a plurality of taps on said transmission line; and
  vernier module means coupled to each of said taps for determining the coincidence of said transmit short pulse and said receive short pulse at said taps.

9. A range measurement apparatus in accordance with claim 8 wherein the electrical length of said transmission line is essentially equal to said coarse range increment and the electrical spacing of said taps along said transmission line in essentially equal to said fine range increment.

10. A range measurement apparatus in accordance with claim 8 wherein said vernier module means comprises:
  coincidence detector means having an input terminal coupled to one of said taps on said transmission line and an output terminal, for providing an output signal whenever said transmit short pulse and said receive short pulse coalesce at said tap;
  decoder means having an input terminal coupled to said output terminal of said coincidence detector means and an output terminal said decoder means responsive to said output signal of said coincidence detector means and providing an output signal after a specified number of said output signals of said coincidence detector means within said observation time; and
  fine range indicator means coupled to said output terminal of said decoder means for providing a fine range indication.

11. A range measurement apparatus in accordance with claim 1 wherein said transmit short pulse trigger means comprises:
  delay generator means coupled to said coarse range control means and to said burst control generator means for providing a time delay between the start of said burst control gate and said trigger pulse, said time delay corresponding to one of said coarse range imcrements; and
  trigger means coupled to said delay generator means and to said transmit short pulse generator means for providing said trigger pulse to said transmit short pulse generator means at the expiration of said time delay.

12. A range measurement apparatus in accordance with claim 11 wherein said trigger means comprises:
  clamping means having a first terminal coupled to said delay generator means and a second terminal, for providing a low level electrical signal clamp for the duration of said time delay;
  vernier range oscillator means having an input terminal coupled to said burst control generator means and an output terminal coupled to said second terminal of said clamping means, for producing a comb wave for the duration of said burst control gate, the leading pulses of said comb wave within said duration of said time delay being clamped to said low level electrical signal by said clamping means; and
  differentiation means having an input terminal coupled to said second terminal of said clamping means for differentiating pulses of said comb wave wherein said transmit short pulse is triggered by first differentiated pulse of said comb wave after termination of said time delay.

13. A method of measuring range comprising the steps of:
  establishing a multiplicity of incremental time delays, each of which corresponds to one of a predetermined multiplicity of coarse range increments each having equal coarse range intervals within which a fine range measurement is to be made;
  transmitting a pulsed signal;
  selecting one of said time delays when said pulsed signal is transmitted;
  triggering a first short pulse at a time after said transmission of said pulsed signal that is essentially equal to said selected time delay;
  receiving echo pulses of said pulsed signal;
  triggering a second short pulse in response to said reception of each of said echo pulses;
  coupling said first and second short pulses to opposite ends of a transmission line the electrical length of which is essentially equal to a coarse range increment and containing taps with electrical spacing therebetween corresponding to a fine range increment; and
  determining the fine range increment within said coarse range increment for said selected coarse range interval by noting the tap on said transmission line at which said first and second short pulses coalesce.

* * * * *